United States Patent

Greiner et al.

[11] Patent Number: 5,572,854
[45] Date of Patent: Nov. 12, 1996

[54] APPARATUS AND METHOD FOR COLLECTING AND PACKAGING PACKAGES, USE OF THE APPARATUS AND PACKAGING SYSTEM

[75] Inventors: Christoph Greiner, Vörstetten; Dietmar Kern, Sexau; Matthias Perner, Freiburg, all of Germany

[73] Assignee: Rhone-Poulenc Rhodia Aktiengesellschaft, Freiburg, Germany

[21] Appl. No.: 357,724

[22] Filed: Dec. 16, 1994

[30] Foreign Application Priority Data

Dec. 22, 1993 [DE] Germany ............... 43 43 960.8

[51] Int. Cl.⁶ ............... B65B 67/12; B65B 67/04
[52] U.S. Cl. ............... 53/459; 53/469; 53/570; 53/390
[58] Field of Search ............... 53/459, 390, 469, 53/570; 141/10, 114

[56] References Cited

U.S. PATENT DOCUMENTS

| | | | |
|---|---|---|---|
| 1,413,868 | 4/1922 | O'Brien et al. | 53/459 X |
| 2,731,184 | 1/1956 | Thurber, Jr. | 53/390 |
| 3,905,406 | 9/1975 | Cruse | 53/390 X |
| 4,031,689 | 6/1977 | Sullivan | 53/390 X |
| 4,890,652 | 1/1990 | Hoerner | 53/390 X |
| 5,205,107 | 4/1993 | Herink | 53/390 X |
| 5,406,777 | 4/1995 | Porto | 53/390 X |

*Primary Examiner*—Horace M. Culver
*Attorney, Agent, or Firm*—Bucknam and Archer

[57] ABSTRACT

An apparatus (10) for holding a collecting container (20) of low stiffness for collecting and packaging re-usable packages for filter tow, has erectable side parts (1) to (6), fastening strips (30) connected with the side parts (1 to 6) for fastening the collecting container (20) on the erected side parts (1 to 6); the side parts (1, 2, 6; 3, 4, 5) are divided into two groups (A) and (B) with the side parts (1, 2, 6) and (3, 4, 5) in each of the groups (A),(B) connected so as to be hinged, and the side parts (1, 2, 6) and (3, 4, 5) in the groups (A),(B) are connected so as to be hinged. The side parts (2, 3) and (5, 6) of the groups (A),(B) are foldable toward the outside away from the collecting container (20) so that the collecting container (20) can be removed from the apparatus (10) laterally or at the front face. The erectable side parts (1 to 6), after they are erected outside of the collecting container (20) delimit a space for accommodating the collecting container (20) and encompass the collecting container (20) or, after they are erected within the collecting container (20), are disposed so that they delimit the maximum amount of space within the collecting container (20) and are encompassed by the collecting container (20). The method is also described.

12 Claims, 1 Drawing Sheet

APPARATUS AND METHOD FOR COLLECTING AND PACKAGING PACKAGES, USE OF THE APPARATUS AND PACKAGING SYSTEM

FIELD OF THE INVENTION

The present invention relates to an apparatus for holding a collecting container of low stiffness for collecting and packaging re-usable packages for filter tow with the arrangement comprising several erectable side parts which, after being erected outside of the collecting container delimit a space for accommodating the collecting container and encompass the collecting container, the use of this apparatus, a method for collecting and packaging re-usable packages for filter tow and a corresponding packaging system.

BACKGROUND OF THE INVENTION

For the production of filters, for example for filter cigarettes, so-called filter tow is used which is supplied packaged in the form of bales in corresponding packages. As the package can be used a re-usable package which is recycled for reuse to the producer of the filter tow. Such packages can comprise materials of low stiffness, such as synthetic fabric, in particular comprising a polypropylene, polyethylene, and polyester fabric, or paper or a synthetic film so that the packages without content can collapse and are unstable.

However, the re-usability of such packages is only ensured if the packages, after their content has been removed, are handled properly, i.e. in particular that the re-usable packages are collected and stored in a suitable manner and are recycled to the producer of the filter tow.

SUMMARY OF THE INVENTION

It is therefore the object of the present invention to develop further the initially described apparatus or the further technical suggestions stated there so that an advantageous possibility for collecting and storing empty packages is created.

This object is solved through an apparatus for holding a collecting container having low stiffness for collecting and packaging re-usable packages for filter tow, in which the apparatus comprises several erectable side parts which, when erected outside of the collecting container, delimit a space for accommodating the collecting container and encompass the collecting container characterized in that a holding device connected with the side parts is provided for fastening the collecting container on the erected side parts, that the side parts are divided over one or several side part groups with the side parts being connected so as to be hinged one with the other in each of the side part groups, and that the side parts in one or several of the side part groups are connected so as to be hinged one with the other so that one or several side parts of one or several of the side part groups can be folded toward the outside away from the collecting container so that the collecting container can be removed from the apparatus laterally or at the front face.

The object is further solved through an apparatus for holding a collecting container of the above type with this apparatus comprising a side part or several erectable side parts which, after being erected outside of the collecting container, delimit a space for accommodating the collecting container and encompass the collecting container or, after being erected within the collecting container, are disposed so that they delimit the maximum amount of space within the collecting container and are encompassed by the collecting container, and a holding device connected with the side part(s) for fastening the collecting container on the erected side part or the erected side parts.

Consequently, this apparatus comprises: one side part or several erectable side parts which, after being erected outside of the collecting container, delimit a space for accommodating the collecting container and encompass the collecting container or, after being erected within the collecting container, are disposed so that they delimit the maximum amount of space within the collecting container and are encompassed by the collecting container, and a holding device which is connected with the side part(s) for fastening the collecting container on the erected side part or the erected side parts. The above listed collecting container comprises a bottom part, a center part, and an upper part and the bottom parts is fixedly or detachably connected with the center part and the upper part can be placed onto the center part in order to close the collecting container and the center part comprises a fastening device with which the collecting container can be fastened on the apparatus according to the present invention. The fastening device can be implemented sc that it can also serve as connecting configuration for connecting the upper part with the center part.

Very generally, the present invention is based on the idea of collecting empty packages, or those no longer needed, for filter tow in an apparatus layed out for this purpose, to store them and to recycle them. This collecting, storing and recycling possibility for re-usable packages for filter tow is used generally where the empty packages accumulate, namely at the cigarette manufacturer for example, consequently, if the content of the packages is filter tow.

The apparatus according to the invention comprises one or several erectable side parts or wall parts which in the erected state either outside of a collecting container delimit a space for accommodating the collecting container and encompass the collecting container or within the collecting container are disposed so that they delimit the maximum amount of volume of the collecting container and are encompassed by the collecting container so that other empty packages can be collected, stored and recycled in the collecting container. The apparatus according to the invention furthermore comprises a holding device disposed on the side parts and serving for the purpose of fastening the collecting container on the erected side parts so that the collecting container cannot collapse. The side parts of the apparatus or of the frame are preferably layed out so as to be foldable. When the apparatus is not used or transported, the side parts, which are otherwise relatively bulky, can be stored or transported in the folded state. The side parts according to the present invention can be layed out in the manner of a frame construction, thus, comprise corresponding (linked) bars. The side parts or the corresponding frames can be connected so as to be hinged with adjacent side parts or frames in order to form foldable side part groups or frame groups.

The Joints can be hinges which can be disposed and fastened on the inside or outside of the frame construction or the side parts. The hinges can, lastly, be detachable or separable.

The material of which the apparatus (frame construction) is comprised, can be for example metal, synthetic material or wood. The apparatus preferably comprises a light material, such as for example aluminum, thin-walled steel pipe and synthetic material. The frame construction can also be built with bars according to the principle of "tent bars" (with cords or springs or similarly connected discrete bars).

The side parts are layed out corresponding to the form and dimensions of the collecting container. Accordingly, in the case of a cubcid collecting container right-angled side parts or corresponding frames are preferably used.

Fastening of the collecting container on the apparatus can be layed out for example as Velcro connection or as clamp connection or can also take place by simply turning the upper edge of the center part of the coilcoting container over the upper edge of the apparatus. But other detachable types of connections are also possible such as for example snap-fastener connections and the like. When using a Velcro connection corresponding segments comprising velcro material are provided as holding device or as fastening device preferably in the region of the upper edge of the apparatus or also in the region of the upper edge of the collecting container in order to ensure the simple assembly of the collecting container in the apparatus and also to ensure that the collecting container stays open. The Velcro strips can be attached on the inside or outside of the apparatus. They are however, preferably applied at the top, thus on an upper edge of the apparatus.

The collecting container comprises a bottom part, a center part and a detachable upper part, and the bottom part is connected fixedly or detachably with the center part, and the upper part can be placed on the center part in order to close the collecting container. The center part comprises the Velcro strips with which the collecting container can be fastened in the apparatus. However, preferably only one Velcro strip is used which extends in the region of an upper edge of the center part of the collecting container outside around the entire center part.

The collecting container is made of preferably a synthetic fabric, in particular comprising polypropylene, polyethylene or polyester. The collecting container can also be made of paper or a synthetic film.

Together with the collecting container the apparatus according to the invention, is used for collecting and receiving packages for filter tow which are identical to or different from the collecting container.

within the scope of the invention, accordingly, not only the packages for filter tow to be collected but also the collecting container itself is re-used. It can, fundamentally, also serve for packaging materials which are similar to the filter tow.

The method according to the invention for collecting and packaging re-usable packages for filter tow comprises the following steps:
- an apparatus for holding a collecting container is erected;
- the collecting container is placed into the apparatus, or the apparatus is placed into the collecting container, and subsequently fastened on the arrangement in order to hold open the collecting container, and
- the accumulating empty packages are collected in the collecting container.

The collecting container can thus be used in the apparatus or the apparatus can be placed in the collecting container.

A special embodiment of the method according to the invention resides therein that the apparatus is set up around a pallet or erected on a pallet. The filled collecting container is preferably closed.

The packaging system according to the invention for collecting and packaging of re-usable packages for filter tow comprises an apparatus and a collecting container and the arrangement holds the collecting container.

Further advantageous and properties of the present invention can be found in the following detailed description of an embodiment of the present invention in conjunction with the enclosed drawing which depicts partially schematically an embodiment of the present invention with an apparatus erected around a pallet and with a collecting container to be accommodated.

Figure 3:
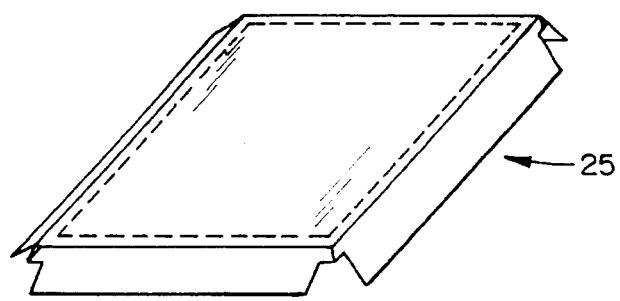
FIG. 3 shows the cover of the collecting container.
Figure 2:
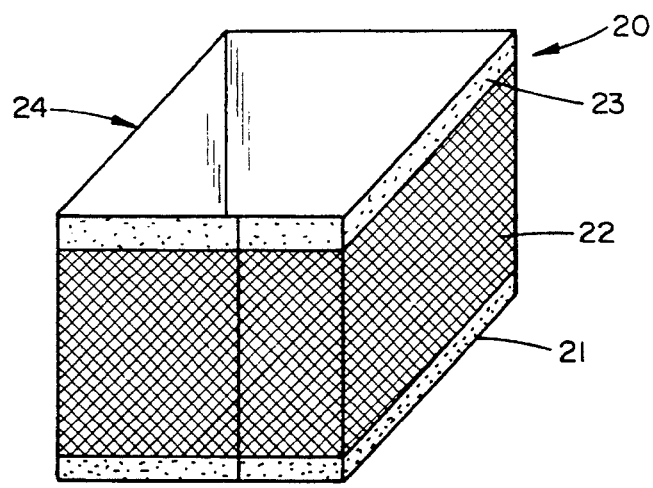
FIG. 2 shows the collecting container.
Figure 1:
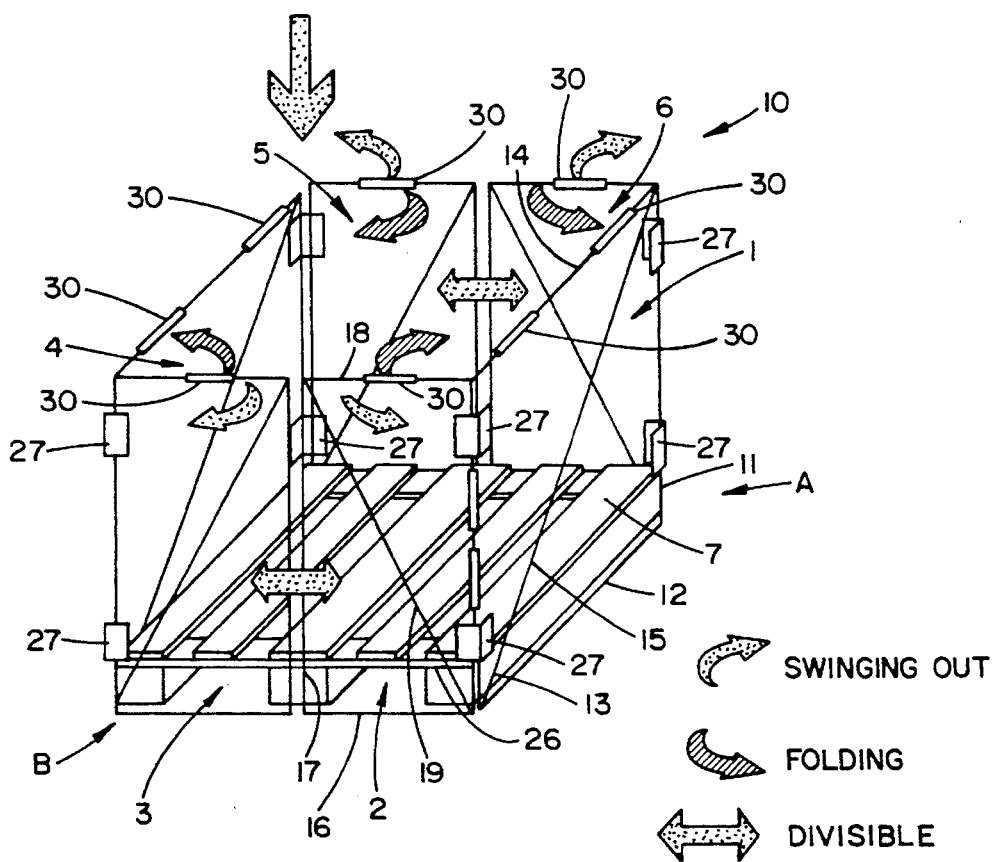
FIG. 1 illustrates the apparatus according to the present invention.

According to the drawings an embodiment of the apparatus 10 according to the invention comprises two side part groups A and B, which are depicted in the drawing in the erected and completely erected state. The first side part group A comprises side parts 1, 2 and 6. With respect to the area they occupy, the short side parts 2 and 6 are in each instance approximately half as large as side part 1. In the erected state of the apparatus 10 shown, the short side parts 2 and 6 are disposed at right angles on the long side part 1. Side parts 2 and 6 are hinged with the long side part 7 and therefore, if the side part group A is to be collapsed, they can be "foldably" folded together in the direction of the arrow in the drawing, and subsequently rest on the long side part in the folded state.

The second side part group B is built similar to the first side part group A and comprises a long side part 4 which is built identically to the long side part 1 of the first side part group A, and two short side parts 3 and 5 built like the side parts 6 and 2 of the first side part group A. In the case of the second side part group B the short side parts 3 and 5 are disposed at right angles on the long side part 4 and connected with hinges with it if the apparatus or the side part group B is erected.

It is further possible that two of the side parts 2, 3 or 5, are folded or folded out (of. arrow "out-foldable") and the apparatus 10, consequently, is opened in order to remove the collecting container 20 from the apparatus 10 laterally or at the front face.

The apparatus 10 or its side part groups A and B are built in the manner of a frame construction with corresponding frame bars. The long side part 1 comprises two corner bars 11 and 13 or rods of equal length, a bottom bar 12 and an upper edge bar 14 which are rigidly connected one with the other, and the bottom bar 12, with the apparatus 10 in the erected state, is disposed on the bottom or underground where the apparatus 10 is standing. The two corner bars 11 and 13, the bottom bar 12 and the upper edge bar 14 together form a right-angled frame. For stabilizing the frame formed in this way of the side part 1 a diagonal stay 15 is rigidly installed in the frame construction of the side part 1. The short side part 2 comprises a short upper edge bar 18, a short bottom bar 18, which is precisely as long as the short upper edge bar 18, and a bar 17 as well as a bar 26 which are of the same length as the corner bar 13 of side part 1. The bar 26 is connected with corresponding Joints 27 which are layed out as hinges disposed on the outside, with the corner bar 13 of the side part 1. The upper edge bar 18, the bar 17, the short bottom bar 16 and the bar 26 together form a right-angled frame. This frame is stabilized by a bracing bar 19.

The second short side part 6 of the side part group A is built similar to the side part 2 and therefore does not need to be described here further. The second side part group B, comprising side parts 3, 4, and 5, is built essentially identically to the first side part group A. In particular, side parts 1 and 4 or the short side parts 3 and 2 or 5 and 6 correspond to one another. A more precise description of the structure of the side parts 3 to 5 of the second side part group B therefore does not need to be given here.

The bracing bars 19 of the short side parts 2 and 3 or 5 and 6 are built into the corresponding side parts so that if the side parts 2 and 3 or 5 6 abut, they form an acute angle at the upper edge bars of the short parts 2 and 3 or 5 and 6. At the sites at which the bars 17 of the short side parts 2 and 3 or 5 and 6 abut, if the apparatus is properly erected, a detachable connection can be provided which connects the corresponding side parts 2 and 3 or 5 and 6 detachably or readily separable (cf. arrow "separable"). This connection (not shown) can be built for example in the form of a hook-and-eye connection, a screw connection or the like. The connections are intended to make it possible to separate or detach the two side part groups A and B without effort in order to be able to carry out a simple assembly and disassembly of the apparatus 10.

At the upper edge bars 14 and 18 of the side parts 1, 2, 3, 4, 5, and 6 commercially available Velcro strips 30 are attached as a holding device.

In the enclosed drawing a collecting container 20 is depicted in the form of an exploded drawing over the apparatus 10 which comprises a continuous bottom part 21, a center part 22 (collar part) fixedly or detachably connected with the bottom part 21, and an upper part 25 which can be placed on the upper edge of the center part 22 in order to close the collecting container 20. In the region of the upper edge 24 of the center part 22 a commercially available Velcro strip 23 is attached outside on the Collecting container 20 as fastening means encircling it. The collecting container 20 is a re-usable container such as can be used for example for packaging filter tow. The collecting container 20 comprises essentially a synthetic fabric whose stiffness is relatively low so that the collecting container 20 would collapse without corresponding bracing and support by the apparatus 10.

For collecting and storing re-usable empty packages for filter tow which correspond to the collecting container 20, the apparatus is erected as follows and it is assumed that the side part groups A and B are in each instance collapsed or folded together.

The side part group A is erected and the short side parts 2 and 6 are folded out. The side part group A is subsequently erected around a previously set up (wood) pallet 7. Subsequently the second side part group B is treated analogously. It is erected, and specifically on its bottom bar, and subsequently its side parts 3 and 5 are folded away from the side part 4. The side part group B is also disposed around the pallet 7 so that, in terms of its periphery, the pallet 7 is encompassed by the apparatus 10, i.e. by its side parts 1 to 6. The two side part groups A and B are subsequently connected at the sites where they abut one another, i.e. at bars 17, in order to improve the stability of the apparatus 10. Into the apparatus 10 assembled in this way the re-usable collecting container 20 is placed so that the bottom part 21 of the collecting container 20 rests on the pallet 7. The collecting container 20 is subsequently attached by means of its Velcro strip 23 on the Velcro strip 30 at the upper edge bars of side parts 1 to 6 of the apparatus 10 in order to form a Velcro connection between apparatus 10 and collecting container 20. The collecting container 20 is hereby held in the apparatus 10 and fastened or held so that it is ensured that the collecting container 20 is held open.

Empty packages can now be readily collected in the collecting container 20 held in apparatus 10. This permits them to be stored without the collecting container 20 needing to be held open every time. Collecting and packaging of empty packages is hereby made considerably easier.

After filling the collecting container 20 the Velcro strips 23 of the collecting container 20 can be detached from the Velcro strips 30 of the apparatus 10 whereupon the upper part 25 is set onto the filled collecting container 20 in order to close it. One of the two detachable connections with which the side parts 2 and 3 or 5 and 6 are connected detachably or readily separably, is detached, whereupon the side parts 2 and 3 or 5 and 6 are folded open and consequently the apparatus 10 is opened on one side.

Since the filled collecting container 20 is already disposed on the pallet 7 it can readily be removed laterally from apparatus 10, by means of for example a fork truck, and be transported for the purpose of shipping it back.

The packaging system comprising apparatus 10 and collecting container 20, can also be used in those cases in which the packages to be collected do not correspond to the collecting container 20.

We claim:

1. An apparatus (10) for holding a collecting container (20) of low stiffness, said container collecting and packaging reusable packages for filter tow, said apparatus comprising a plurality of erectable side parts (1) to (6), said side parts after being erected outside of said collecting container, delimiting a space for accommodating said collecting container and encompassing the collecting container, and further comprising a holding device (30) connected with said side parts (1) to (6) for fastening the collecting container (20) on said side parts (1) to (6), after they have been erected, said side parts being divided into at least two groups (A) and (B), each one of said groups (A) and (B) having at least two side parts (1,2,6); (3,4,5) at right angle with respect to each other when in the erected condition, said side parts (1),(2),(6) and (3),(4),(5) being hingeably connected and at least one of said side parts (1) to (6) is foldable toward the outside away from the collecting container (20) whereby said collecting container (20) is removable from said apparatus (10) and when all said parts (1) to (6) are foldable, said apparatus is disassemblable.

2. The apparatus according to claim 1 which has a lateral side and a front face and said container is removed from said lateral side.

3. The apparatus according to claim 1 wherein said container has a front face and a lateral side and is removed at the front face thereof.

4. The apparatus according to claim 1 wherein said side parts (1) to (6) are layed out in the form of a frame.

5. The apparatus according to claim 1 wherein said side parts (1) to (6) are rectangular and each of said side parts comprises in each instance a rectangular frame.

6. The apparatus according to claim 1 wherein said groups (A) and (B) are essentially equal, each of said groups (A) and (B) is built of three side parts (1, 2, 6) and (3, 4, 5), said side parts (1),(2),(6) and (3),(4),(5) of each group (A) and (B) are hingeably connected, two of said side parts (2, 6) and (3, 5) are folded toward the third side part (1) and (4) and after folding they are disposed in a plane parallel to and bordering on the connected third side part (1) and (4).

7. The apparatus according to claim 1 wherein said holding device (3) comprises fastening devices attached on said side parts (1) to (6), said collecting container has fastening devices (23), said fastening devices on said container cooperate with said fastening devices (23) on said side parts (1) to (6) for fastening the collecting container (20) on the apparatus (10) after it has been erected.

8. The apparatus according to claim 7 wherein said fastening devices on said collecting container and on said side parts (1) to (6) are strip-form Velcro segments.

9. The apparatus according to claim 7 wherein the apparatus (10) after it is erected comprises an encircling upper edge, said holding device (30) is disposed on said upper edge.

10. The apparatus according to claim 1 wherein said collecting container (20) comprises a bottom part (21), a center part (22) and an upper part (25), said bottom part (21) being fixedly or detachably connected with said center part (22), said upper part (25) being placed onto said center part (22) in order to close the collecting container (20) and the center part (22) further comprises a fastening device (23) for fastening the collecting container (20) on the apparatus (10) by means of fastening devices attached to said side parts (1) to (6).

11. A method of collecting and packaging re-usable packages for filter tow which comprises the steps of (a) placing said collecting container into an apparatus (10) and erecting said apparatus; said apparatus comprising a plurality of erectable side parts (1) to (6), said side parts after being erected outside of said collecting container, delimiting a space for accommodating the collecting container and encompassing the collecting container, and further comprising a holding device (30) connected with said side parts (1) to (6) for fastening said collecting container (20) on said side parts (1) to (6), after they have been erected, said side parts being divided into at least two groups (A) and (B), each one of said groups (A) and (B) having at least two side parts (1,2,6);(3,4,5) at right angle with respect to each other when in the erected condition, said side parts (1),(2), (6) and (3),(4),(5) being hingeably connected and at least one of said side parts (1) to (6) is foldable toward the outside away from the collecting container (20) whereby said collecting container (20) is removable from said apparatus (10) and when all said parts (1) to (6) are foldable, said apparatus is disassemblable, said collecting container (20) having a bottom part (21), a central part (22), said central part having an outside part and an upper edge (24), a fastening device (23) comprising a Velcro strip, said Velcro strip extending on the outside of and around said central part;

(b) fastening said container to said apparatus;

(c) holding said container open; and (d) placing the packages into said container;

(e) and then closing the container.

12. The method according to claim 11 wherein said apparatus (10) is erected around a pallet (7), said pallet (7) being encompassed by said side parts (1) to (6).

* * * * *